United States Patent
Hughes et al.

(10) Patent No.: US 8,709,255 B2
(45) Date of Patent: Apr. 29, 2014

(54) SELENIUM REMOVAL METHODS AND SYSTEMS

(75) Inventors: Mark A. Hughes, Bartlesville, OK (US);
Roland Schmidt, Bartlesville, OK (US);
Joseph B. Cross, Flower Mound, TX (US)

(73) Assignee: Phillips 66 Company, Houston, TX (US)

( * ) Notice: Subject to any disclaimer, the term of this patent is extended or adjusted under 35 U.S.C. 154(b) by 537 days.

(21) Appl. No.: 13/152,938

(22) Filed: Jun. 3, 2011

(65) Prior Publication Data

US 2011/0297616 A1 Dec. 8, 2011

Related U.S. Application Data

(60) Provisional application No. 61/352,644, filed on Jun. 8, 2010.

(51) Int. Cl.
*C02F 1/42* (2006.01)

(52) U.S. Cl.
USPC .............................. 210/679; 210/688; 210/263

(58) Field of Classification Search
USPC .......................................... 210/679, 688, 263
See application file for complete search history.

(56) References Cited

U.S. PATENT DOCUMENTS

| | | | |
|---|---|---|---|
| 4,500,327 A | 2/1985 | Nishino et al. | |
| 4,863,489 A | 9/1989 | Suggitt | |
| 7,250,387 B2 | 7/2007 | Durante et al. | |
| 7,419,606 B2* | 9/2008 | Johnson et al. | 210/752 |
| 7,435,286 B2 | 10/2008 | Olson et al. | |
| 7,906,027 B2* | 3/2011 | Cross et al. | 210/688 |
| 2005/0079114 A1* | 4/2005 | Dubrovsky | 423/1 |
| 2005/0093189 A1* | 5/2005 | Vo | 264/29.1 |
| 2005/0100699 A1 | 5/2005 | Durante et al. | |
| 2007/0265161 A1 | 11/2007 | Gadkaree et al. | |
| 2008/0207443 A1 | 8/2008 | Gadkaree et al. | |
| 2008/0250715 A1 | 10/2008 | Cooper et al. | |
| 2009/0062119 A1 | 3/2009 | Olson et al. | |

FOREIGN PATENT DOCUMENTS

| | | |
|---|---|---|
| JP | 62274032 | 11/1987 |
| JP | 11207365 | 8/1999 |
| WO | 2009032129 | 3/2009 |

* cited by examiner

*Primary Examiner* — Chester Barry
(74) *Attorney, Agent, or Firm* — Phillips 66 Company

(57) ABSTRACT

Described herein is a cost effective means for selenium recovery and refining relying on an impregnated substrate. The substrate is impregnated with selenium and provides a system and method for the environmentally safe discharge of previous selenium-contaminated solutions and an environmentally safe discharge of industrial waste water.

20 Claims, 2 Drawing Sheets

SELENIUM REMOVAL METHODS AND SYSTEMS

CROSS-REFERENCE TO RELATED APPLICATIONS

This application is a non-provisional application which claims the benefit of and priority to U.S. Provisional Application Ser. No. 61/352,644 filed Jun. 8, 2010, entitled "Selenium Removal Methods and Systems," which is hereby incorporated by reference in its entirety.

BACKGROUND

The described application relates generally to methods and systems involving removal of selenium, particularly removal of selenium from water containing one or more forms of selenium.

Selenium is an essential element in trace amounts in humans and animals. Unfortunately, in high amounts, selenium is often toxic. Water irrigation of alkaline soils has lead to selenium removal, which then concentrates in downstream water systems. Selenium present in coal is released after burning and accumulates in waste ponds.

Selenium often occurs in water in form of selenocyanate ($SeCN^-$, a zero valance state), selenate ($SeO_4^{-2}$, a +6 valance state) or selenite ($HSeO_3$ or $SeO_3^{-2}$, a +4 valance state). Under strongly reducing conditions, it appears as selenide ($HSe^-$). Selenate is more common in water that is alkaline and oxidizing. Selenite is more common in water that is acidic and only moderately oxidizing. Selenium, including selenate, has proven to be difficult to remove from solution. Selenate, for example, is very soluble with no known precipitants and cannot be removed by adsorption or filtration. Most conventional methods for removing forms of selenium include desalting, absorption, chemical reduction, or using biologics. Most removal methods are interfered with by other competing anions in solution (e.g., silicate, bicarbonate, sulfate). Thus, selenium removal methods are generally mildly or moderately operative with only one form of selenium. Selenium removal systems also generally produce high waste volumes (e.g., sludge), are slow, leave very large carbon footprints and/or are very expensive.

SUMMARY

Disclosed herein are methods and systems for selenium removal from water that overcome or alleviate one or more problems observed in the prior art.

In some embodiments, a system includes a substrate impregnated with at least one material and capable of removing selenium and other components, such as heavy metals and soft Lewis acids, from a solution. The substrate comprises activated carbon or an inorganic material having a large surface area. The substrate when impregnated is stable when added to a solution or when a solution is passed in contact with the substrate. The combination of impregnating material(s) and substrate together remove all forms of selenium, including selenide, selenocyanate, selenite or selenate from the solution. Optionally, a secondary material is included with the system and provided in the solution. The secondary material, among other things, improves selenium removal, such as when in one or more forms, and may enhance removal of the other components from the solution. Secondary materials include but are not limited to one or more reducing agents or an oxidizing agent.

In further embodiments, a method for removing selenium from a solution includes the steps of preparing a selenium-laden substrate, wherein the substrate is initially laden with selenium at an elevated temperature; and introducing the substrate to a solution containing selenium, wherein the solution is in-line with a process system and has a pH less than about 10. Generally, the solution has a temperature less than about 80° C. The selenium-laden substrate is in a form selected from the group consisting of powder, particles, or pellets less than 4 mm in diameter. The selenium-laden substrate may be initially treated with an alkaline base or halogen salt of an alkaline base before laden with selenium. The solution may be a sour water system. The method may also remove additional components in solution, such as those selected from the group consisting of soft Lewis acid and borderline Lewis acid. The pH of the solution is generally about or less than 4 when removing selenium. The pH of the solution may be raised to greater than about 4 when removing additional components in solution, such as mercury or those selected from the group consisting of soft Lewis acid and borderline Lewis acid. The substrate may be in the form of particles packed in a column that is in-line with a process system.

Additional embodiments described herein include a selenium removal system comprising: a selenium-laden substrate, wherein the substrate is initially laden with selenium at an elevated temperature and is in-line with a process system; and an aqueous solution containing selenium, the solution having a pH less than about 10, wherein the aqueous solution passes through the selenium-laden substrate and selenium is removed from the solution while in line with the process system. The substrate may be treated with an alkaline base or a halogen salt of an alkaline base before laden with selenium. The alkaline base or a halogen salt of an alkaline base may include potassium iodide and potassium hydroxide. The elevated temperature for initially preparing the substrate may be greater than 500° C. The substrate may be free of sulfur. The substrate may be activated carbon. The substrate may be in a column bed. The substrate may be in the form of pellets. The substrate may be in a form selected from the group consisting of powder and particles less than 4 mm in diameter. The aqueous solution pH may be between about 2 and about 7. The pH of the solution may be raised to greater than about 4 when removing additional components in the solution, such as those selected from the group consisting of soft Lewis acid and borderline Lewis acid. The aqueous solution may further comprise a reducing agent. The reducing agent may be thiosulfate. The aqueous solution temperature may be between about 50 and about 80° C. The aqueous solution pH may be adjusted to greater than about 4 for removal of mercury. The flux of aqueous solution may be less than about 10 gallons per minute/$ft^2$.

Those skilled in the art will further appreciate the above-noted features and advantages of the invention together with other important aspects thereof upon reading the detailed description that follows and in conjunction with the drawings.

BRIEF DESCRIPTION OF THE DRAWINGS

For more complete understanding of the features and advantages of the inventions described herein, reference is now made to a description of the invention along with accompanying figures, wherein.

DESCRIPTION

Figure 1:
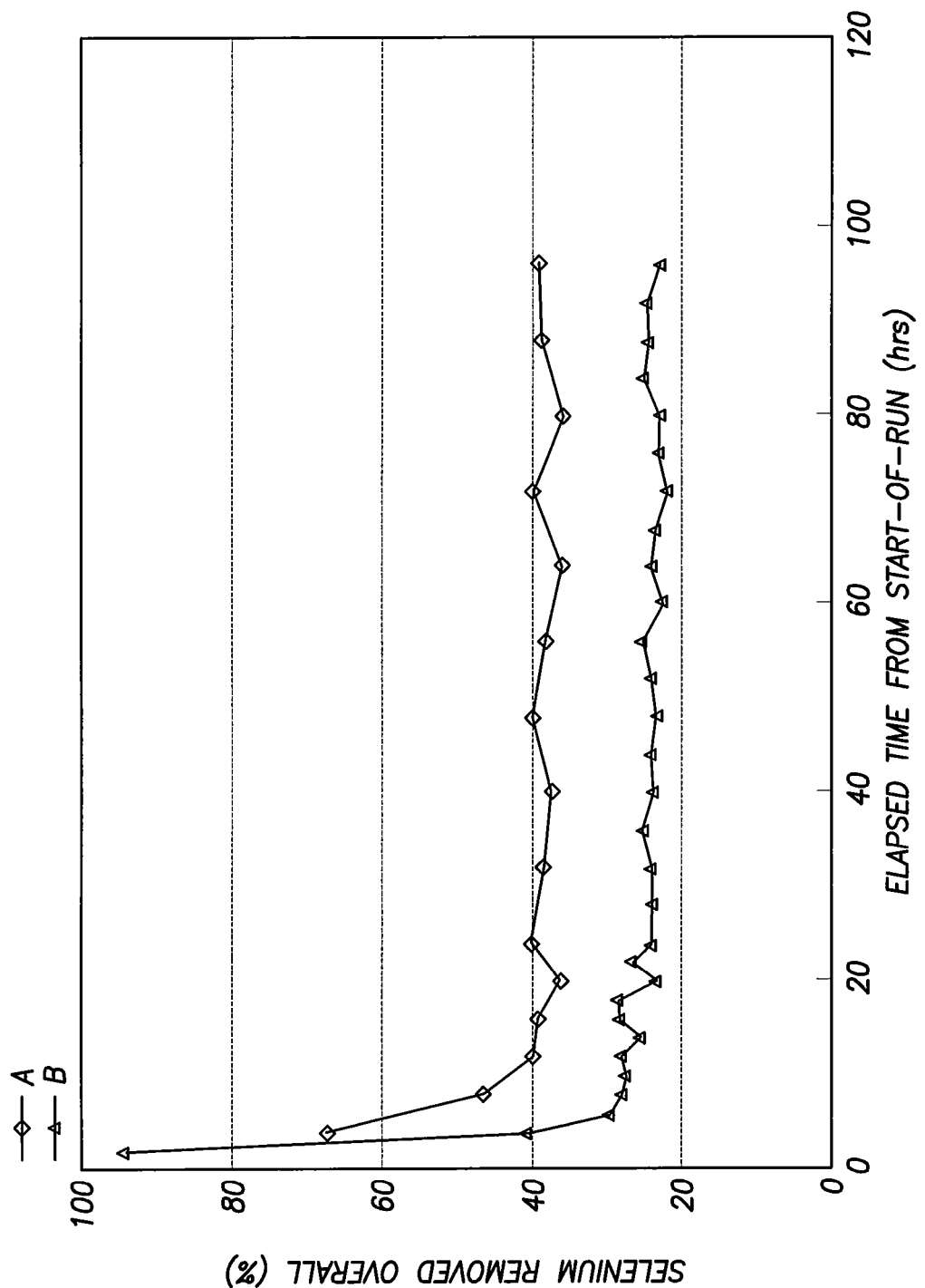
FIG. 1 is a representative graph showing the amount of selenium removed as a function of time for a support described herein (A) as compared with an alternative support (B)

Although making and using various embodiments are discussed in detail below, it should be appreciated that the description provides many inventive concepts that may be embodied in a wide variety of contexts. Any specific embodiments discussed herein are merely illustrative of ways to make and use the invention, and do not limit the scope of the invention.

References will now be made to the drawings. The drawing figure is not necessarily to scale and certain features may be shown exaggerated in scale or in somewhat generalized or schematic form in the interest of clarity and conciseness.

Selenium is a non metallic chemical element and among the rarer elements on the earth's surface. In the atmosphere, selenium is present as a methyl derivative. Selenium is produced in countries such as Bolivia, Canada, Russia and the United States. Selenium is naturally present in phosphate fertilizers and therefore is in well fertilized soil. Selenium, uncombined, is found in about 40 selenium-containing minerals and often occurs together with sulfides of metals, such as copper, zinc, lead. Selenium is thus present in crudes and when removed ends up in sour water systems. Selenium tends to concentrate in sour water tank sludge and as deposits in stripper reboilers and fouls part of the process system (e.g., stripper). To remove built up deposits of selenium; a system is often shut down and requires special treatment of the effluent waste water treatment system. In stripped sour water, selenium is generally in the form of hydrogen selenide and selenocyanate.

As a result of fertilizing, mining, processing and combustion of other products, selenium settles from air and from selenium-containing waste and ends up in disposal sites or in water (e.g., irrigation drainage water, water well, refinery waste, mine waste, metallurgy process solutions, etc.). Described herein is an improved system and method for removing selenium from solution, such as a process system, effluent or aqueous stream that contains selenium. The aqueous stream may be any stream in or resulting from an existing process or water system that includes process or waste water that has selenium therein. The system and method described herein does not require shut down of an existing system.

In one or more embodiments, the system and method described herein includes a removal system having a substrate impregnated with selenium such that fluid components passing through the system are capable of partially or fully saturating the system. The selenium loaded on the substrate provides an active form of the selenium reactive with additional selenium during sorption to form more stable compounds. Relative to this active form of the selenium as loaded on the substrate, selenium absorbed on prior sorbents forms stabilized compounds.

The substrate includes a form of carbon or an inorganic material. The source of carbon may be any of a number of typical carbon materials, including coal, shells, sawdust, lignite, as examples. The inorganic material may include substrates derived from alumina, silica, clay, mullite, aluminum titinate, titania, zirconia, ceria particles, and the like.

The substrate is first formed to a desired and predetermined particle size. Suitable particle sizes include 10 mm or less or may be 4 mm or less or may be 1 mm or less. The shaping and sizing to obtain a desired particle size may occur via molding and/or crushing methods, as examples, such as those known to one of skill in the relevant art. The shaped and sized particles are often referred to as pellets, granules or powders, depending on their shape, size and/or other characteristics. For use, the substrate (as shaped and sized particles) is generally porous, which increases the surface area of the substrate and may include creating internal surfaces. In some embodiments, the shaped and sized substrate as a starting material has an increased surface area (e.g., is porous). In one or more embodiments, the shaped and sized substrate as a starting material must be made to have an increased surface area (e.g., porous).

The substrate with increased surface area (e.g., in a porous state) is capable of becoming impregnated with one or more materials. In some embodiments, the substrate with increased surface area may be pretreated to improve binding with the material. Full saturation indicates that an initial surface of the substrate (with or without pretreatment) is generally covered by the material(s). Even with full saturation by the material(s), a substrate described herein may remain suitable for removal of additional selenium contained in a solution, due in part to the thermodynamics of saturation and conditions used to saturate the substrate. In some instances, selenium loading of 1-10 wt. % is acceptable for use. In addition, impregnation of greater than 10 wt. % selenium loading or greater than 20 wt. % selenium loading may be achieved as described herein.

The system described herein, which contains a substrate having an increased surface area, such as activated carbon or an activated inorganic material, also includes impregnation of the substrate with at least one contacting material. The contacting material is at least selenium. In one or more embodiments, the selenium is in the form of elemental selenium. In addition or as an alternative, other forms of selenium may be used or may be used in combination with elemental selenium. For example, selenite may be reduced by a strong reducing agent (e.g., ascorbic acid, hydrazine hydrochloride, hydroxylamine hydrochloride) to form, in whole or in part, elemental selenium. Other forms of selenium include but are not limited to selenium salt and selenium oxide. In addition or as an alternative, other elements, molecules or compounds may also be present on the surface of the substrate, such as sulfur. Selenium may be synthesized from other compounds, which provide an elemental form of selenium. Selenium, in an elemental and/or other form, is prepared for impregnating a substrate (with an increased surface area) as described herein by heating it in the presence of the substrate. In some embodiments, selenium, in one or more forms, is capable of impregnating the substrate at an elevated temperature in an inert atmosphere. The temperature here may be greater than the melting temperature of elemental selenium. The inert environment may include a gas or gas mixture, such as nitrogen, argon, helium, carbon dioxide, as examples. In other embodiments, selenium, in one or more forms, is capable of impregnating the substrate at a temperature that is below the melting temperature of elemental selenium. An example includes calcining a selenium salt. In still further embodiments, selenium, in one or more forms, is capable of impregnating the substrate at an elevated temperature in a reactive environment. An example includes reacting selenium oxide in hydrogen. In still further embodiments, a chemical reaction is used to add selenium to the substrate from a reactive gas, such as hydrogen selenide (often with sulfur dioxide). Still further, selenium in one form may be extracted and further oxidized (e.g., with sodium carbonate), converted to an acid and then reacted with a gas, such as sulfur dioxide.

In some embodiments, the substrate having an increased surface area, such as activated carbon or an activated inorganic material, is pretreated before impregnation with the contacting material(s). Pretreatment may provide sites for complexation with the contacting material. Pretreatment generally includes an agent capable of complexing with the contacting material, such as selenium. Suitable pretreatments would include an alkaline base, halogen salt of an alkaline base, or the like that are capable of linking to the substrate and complexing with selenium. For example, the substrate having an increased surface area may be pretreated with potassium iodide and/or potassium hydroxide.

The substrate is impregnated (with or without pretreatment) with the selenium by heating at an elevated temperature. In some embodiments, the elevated temperature used is greater than about 200° C. The elevated temperature may be greater than 500° C. The heating temperature may be about 600° C. The temperature may also be about 650° C. or greater. For example, when selenium is in an elemental form, it can impregnate a substrate in an inert environment at a temperature greater than 500° C. or greater than 600° C. or at or greater than 650° C. The inert environment is one created by a vacuum or by using an inert gas or gas mixture that may include nitrogen, argon, helium, carbon dioxide, as examples. Selenium is heated in the presence of the substrate for several minutes or for up to several hours. In one or more embodiments, heating generally proceeds for a couple hours, such as about 120 minutes. In further embodiments, heating may proceed to up to or greater than 24 hours.

The impregnated substrate described herein includes in one or more embodiments a selenium impregnated activated carbon (or inorganic material) substrate packed as a bed. When packed, the selenium-laden substrate is generally in the form of particles, pellets or granules. In addition or as an alternative, the selenium-laden substrate may be a powder, which may be added directly to a solution.

The selenium-laden substrate described herein is capable of removing selenium as well as other materials present in an aqueous solution when the aqueous solution is in the presence of the selenium-laden substrate. In one form, the selenium-laden substrate is added to a solution, allowed to settle and then collected via a filter. In another form, the solution is passed through a bed comprising the selenium-laden substrate. When a bed of the selenium-laden substrate is used, the bed may be in the form of a column containing therein the impregnated substrate. The shape and size of the bed may be governed by the hydraulic flux of the solution. Common flux values in industrial process systems are about 1 gallon per minute (GPM)/ft$^2$ to about 5 GPM/ft$^2$. Higher rates may also be used. The material selected for the column is generally cooperative with the solution composition and temperature.

Selenium present in the aqueous solution may be in the form of selenide, hydrogen selenide, selenocyanate, selenite or selenate, as examples. In one or more embodiments, a secondary material may be additionally included in the aqueous solution. The secondary material may comprise a reducing agent (e.g., thiosulfate, bisulfate, sulfur dioxide, and syngas, as representative examples). The secondary agent may comprise an oxidizing agent, such as peroxide, chlorine, oxygen, air, as representative examples. In some forms, the secondary material may be present as a natural component of the aqueous solution upon origination thereof. In addition or as an alternative, the secondary material is added to the aqueous solution.

In some embodiments, the solution is a continuous stream. In additional embodiments, some or all of the solution may be re-routed to pass through the selenium-laden substrate more than once. In addition or as an alternative, the solution may pass through more than one selenium-laden substrate.

In some forms, the aqueous solution may be adjusted prior to passing through the selenium-laden substrate. In one or more embodiments, the solution is adjusted to a pH of between about 1 and about 10 or between about 1 and 8 or between about 2 and 7 or between about 2 and 6 or between about 2 and 5. Adjustment of the pH typically includes an addition of one or more buffers or pH modifiers known to one skilled in the relevant art. The pH may be adjusted still further for additional removal of further toxins, such as arsenic, mercury, cadmium, platinum, and/or other metals (e.g., those that form soft acids or are on the border). For example, for mercury removal, the pH may be further adjusted and made higher thereafter. The pH may be at or less than about 4 or 5 to remove selenium and then raised to a higher pH to remove mercury.

In one or more embodiments, the aqueous solution is temperature adjusted. A temperature range of 1° C. to about 100° C. is suitable; generally the upper temperature limit is that which is less than boiling and is, thus, sensitive to the pressure of the aqueous solution and to its constituents. In one or more embodiments, the temperature is in a range from between about 40° C. to under about 100° C. or is between about 50° C. and about 90° C. or is between about 60° C. and about 80° C.

The aqueous solution may flow through the bed at a flow rate consistent with a process system flow rate. Generally, the hydraulic flux is between about 0.1 to about 1000 GPM/ft$^2$. In one or more embodiments, the hydraulic flux is less than about 100 GPM/ft$^2$ or is less than about 50 GPM/ft$^2$ or is less than about 10 GPM/ft$^2$ or is in a range from between about 0.1 to about 10 GPM/ft$^2$ or is between about 1 to about 5 GPM/ft$^2$ or is between about 2 to about 5 GPM/ft$^2$ or is between about 1 to about 4 GPM/ft$^2$.

In one example, 9 g of activated carbon, initially complexed with potassium hydroxide and potassium iodide, having a particle size of about 0.9 mm was heated in a vacuum chamber in the presence of 1 g of powdered elemental selenium. The temperature of the chamber was 650° C. Heating was continued for about 120 minutes. After heating, an impregnated substrate was produced, which, in this example was a selenium impregnated carbon adsorbant. The adsorbant contained about 6.5% selenium by weight. No further heating step or activation step was required. The selenium-laden substrate was packed into a bed that was 15 cm long and 1.02 cm in diameter. The bed was fed with an aqueous solution containing selenium. The composition of the aqueous solution is provided in the table.

| Composition of aqueous solution | |
|---|---|
| | ppm |
| Cations | |
| Sodium | 15 |
| Calcium | 1.5 |
| Ammonium | 293 |
| Anions | |
| Chloride | 10 |
| Sulfide | 560 |
| Sulfite | 0.6 |
| Thiosulfate | 35 |
| Thiocyanate | 37 |
| Acetate | 128 |
| Proprionate | 89 |
| Butyrate | 36 |

-continued

| Composition of aqueous solution | |
|---|---|
| | ppm |
| Other | |
| Total organic compounds (organic acids and phenolics) | 444 |
| Phenolics | 329 |
| Se total | 1500 ppb |

The aqueous solution was simulated stripped sour water (SSW) that included 1.5 ppm selenium in the form of selenocyanate ($SeCN^-$). The pH of the simulated SSW was about 2.5. The simulated SSW was passed through the 15 cm long by 1.02 cm diameter bed containing the selenium-laden substrate for 100 hours at 3.0 GPM/ft$^2$. The aqueous solution was maintained at a temperature of about 68° C. Referring now to FIG. 1, line A is the amount (as a percentage) of selenium removed as a function of time using the substrate described herein. For comparison, the simulation described was replicated except that the same size column was instead filled with 0.9 mm activated carbon pellets that had sulfur dispersed on the surface. Line B of FIG. 1 is the amount (as a percentage) of selenium removed as a function of time with the comparative substrate.

FIG. 1 clearly shows that the system described herein, which included a selenium impregnated adsorbant, was effective at removing selenium from an aqueous sour water solution that included 1.5 ppm selenium in the solution. The system continuously removed from the sour water at or greater than 40% of the selenium for a full 100 hours. The activated carbon with sulfur dispersed on its surface only removed about 20% of the selenium for 100 hours. Thus, the selenium-laden substrate performed significantly better and twice as well as an activated carbon that had sulfur dispersed on its surface. In addition, the selenium-laden substrate when used or spent provided a source of selenium that was free of sulfur.

Figure 2:
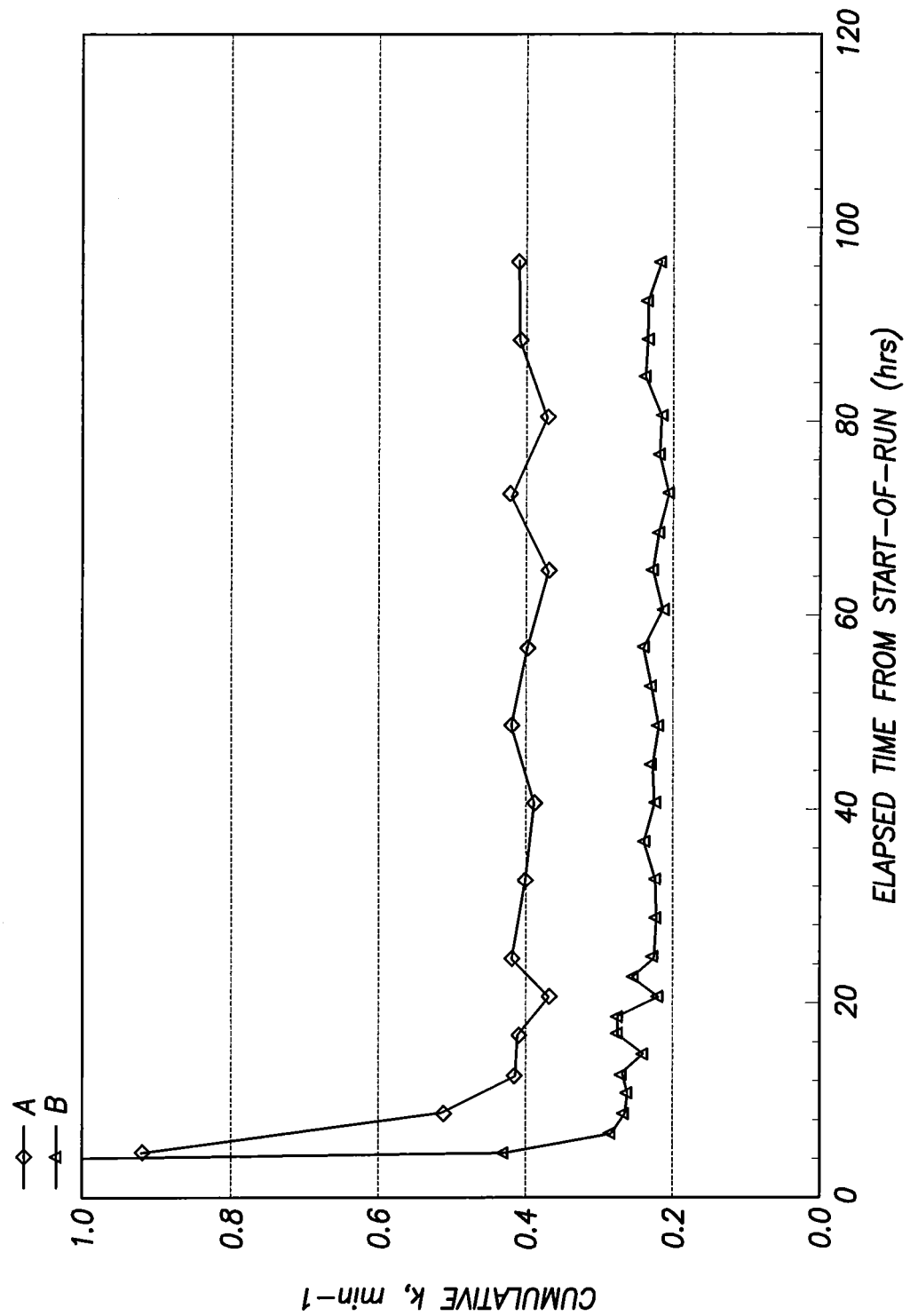
FIG. 2 is a representative graph showing the rate of selenium removed as a function of time for a support described herein (A) as compared with an alternative support (B).

Referring now to FIG. 2, line A shows the rate of selenium removed as a function of time for the selenium-impregnated substrate describe herein over a 100 hour run time as compared with the activated carbon substrate that had sulfur dispersed on its surface (line B). The figure shows that the system removed selenium at a much higher rate than the alternative substrate. The system clearly removed selenium at a rate double that of the comparative system that included an adsorbant with sulfur dispersed on its surface.

Because the amount of selenium removal is, in part, dependent on the length of the packed bed, increasing the bed length increases the amount of selenium removed in the example described above and for other aqueous solutions that include selenium in the solution. Taken another way, a system as described herein enables use of a shorter bed while still being effective in removing desired quantities of selenium from solution. Thus, relying on a system described herein should reduce overall operation cost and materials, especially when replacing current methods of removing selenium from solution.

In the example described, the effluent (output) stream contained <900 ppm Se in the form of selenocyanate. Further, selenium loading on the substrate (already pre-laden with selenium) was 0.45% by weight; total selenium loading (not taking into account the initial impregnation of selenium on the substrate) was limited generally by the length of the time the example was run. In 100 hours, the selenium-laden substrate continuously removed about 40% of the selenium in solution. This means the solution could be run for well over 11,000 hours before theoretically reaching 50% loading. In addition, it was found that the valance of the removed selenium was not altered with the system and method described herein.

In one or more embodiments, the addition of thiosulfate results in additional selenium species being removed from the aqueous solution, such as selenite. In addition or as an alternative, by adding a mild oxidizing agent, selenide may be removed from the solution. In additional embodiments, by adding a strong reducing agent, selenate may be removed from the solution. Additional toxins, such as mercury, arsenic, cadmium, as examples, may similarly be removed with the system and method described herein. For mercury removal, a pH adjustment may be made, such that the aqueous solution is less acidic, generally at a pH greater than 4. The pH adjustment may readily be made by adding, sodium hydroxide or potassium hydroxide or an alkali solution, as examples.

On an industrial scale, using a system described herein, in which the substrate is laden with 10-15 wt. % selenium, a column bed filled with the selenium-laden substrate that is about 14 feet in length and 7-12 feet in diameter would be operational for at least or more than six months, assuming the aqueous solution contained about 2 ppm of selenium and flowed at a rate of about 250 gallons per minute.

In one or more embodiments, the system and method described herein provide an improved system and method for removing selenium and other toxins, such as mercury, arsenic, and cadmium, from a solution. The system and method described herein are regenerative. A used substrate (that is, one which has had an aqueous selenium-containing solution pass through it) provides a source of selenium which may be free of sulfur. In addition, a used substrate as described herein still contains sites for removal of one or more soft Lewis acid, such as those comprising mercury, cadmium, zinc, silver, lead, gold, as examples, as well as arsenic and antimony, as examples of metals having borderline properties, similar to those of soft Lewis acids.

The system described herein may be added downstream in a processing system to remove selenium and/or other toxins without requiring the system to be off line.

Described herein is a cost effective means for selenium recovery and refining. In addition, described herein is an environmentally safe system and method for discharge of previous selenium-contaminated solutions. Moreover, described herein is an environmentally safe discharge of industrial waste water.

Although the foregoing description of embodiments have shown, described and pointed out certain novel features of the invention, it will be understood that various omissions, substitutions, and changes in the form of the detail as illustrated as well as the uses thereof, may be made by those skilled in the art, without departing from the scope of the invention. Particularly, it will be appreciated that the one or more embodiments may manifest itself in other shapes and configurations as appropriate for the end use of the article made thereby.

What is claimed is:
1. A method comprising:
 preparing a selenium-laden substrate, wherein the substrate is initially laden with selenium at an elevated temperature greater than 200° C; and
 introducing the substrate to a solution containing selenium for removing the selenium from the solution, wherein the solution is in-line with a process system and has a pH less than about 10.

2. The method of claim 1, wherein the solution has a temperature less than about 80° C.

3. The method of claim 1, wherein the selenium-laden substrate is in a form selected from the group consisting of powder, and particles less than 4 mm in diameter.

4. The method of claim 1, wherein the selenium-laden substrate is treated with an alkaline base or halogen salt of an alkaline base before laden with selenium.

5. The method of claim 1, wherein the solution is in a sour water system.

6. The method of claim 1, wherein the method removes additional components in solution selected from the group consisting of soft Lewis acid and borderline Lewis acid.

7. The method of claim 1, wherein the pH of the solution is about or less than 4.

8. The method of claim 7, wherein the pH of the solution is raised to greater than about 4 and removes additional toxins in solution selected from the group consisting of soft Lewis acid and borderline Lewis acid.

9. The method of claim 3, wherein the particles are packed in a column that is in-line with a process system.

10. A selenium removal system comprising:
a selenium-laden substrate, wherein the substrate is initially laden with selenium at an elevated temperature greater than 200° C. and is in-line with a process system; and
an aqueous solution containing selenium, the solution having a pH less than about 10, wherein the aqueous solution passes through the selenium-laden substrate and selenium is thereby removed from the solution while in line with the process system.

11. The system of claim 10, wherein the substrate is treated with an alkaline base or a halogen salt of an alkaline base before laden with selenium.

12. The system of claim 10, wherein the alkaline base or a halogen salt of an alkaline base includes potassium iodide and potassium hydroxide.

13. The system of claim 10, wherein the aqueous solution pH is between about 2 and about 7.

14. The system of claim 13, wherein the pH of the solution is raised to greater than about 4 for removal of additional components in solution selected from the group consisting of mercury, soft Lewis acid and borderline Lewis acid.

15. The system of claim 10, wherein the aqueous solution further comprises a reducing agent.

16. The system of claim 15, wherein the reducing agent is thiosulfate.

17. The system of claim 10, wherein the aqueous solution temperature is between about 50 and about 80° C.

18. The system of claim 10, wherein the elevated temperature is greater than 500° C.

19. The system of claim 10, wherein the substrate is activated carbon.

20. The system of claim 10, wherein the substrate is free of sulfur.

* * * * *